(12) United States Patent
Ohno

(10) Patent No.: US 9,896,007 B2
(45) Date of Patent: Feb. 20, 2018

(54) OCCUPANT PROTECTION DEVICE

(71) Applicant: TOYOTA JIDOSHA KABUSHIKI KAISHA, Toyota-shi, Aichi-ken (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/173,028

(22) Filed: Jun. 3, 2016

(65) Prior Publication Data

US 2017/0036634 A1 Feb. 9, 2017

(30) Foreign Application Priority Data

Aug. 3, 2015 (JP) .................. 2015-153279

(51) Int. Cl.
*B60N 2/44* (2006.01)
*B60R 21/013* (2006.01)
(Continued)

(52) U.S. Cl.
CPC ............. *B60N 2/44* (2013.01); *B60N 2/4415* (2013.01); *B60R 21/013* (2013.01);
(Continued)

(58) Field of Classification Search
CPC ............... B60R 21/207; B60R 21/013; B60R 21/23138; B60R 2021/23107; B60R 2021/0006; B60R 2021/0032; B60R 2021/23146; B60R 2021/0023; B60N 2/44; B60N 2/4415; B60N 2/24; B60N 2/38; B60N 2/449

See application file for complete search history.

(56) References Cited

U.S. PATENT DOCUMENTS 3,623,768 A * 11/1971 Capener ................ B60R 21/207
280/730.2
4,536,030 A * 8/1985 Sakurada ............... A47C 7/022
297/284.9
(Continued)

FOREIGN PATENT DOCUMENTS

JP S61-011008 A 1/1986
JP 2010-064632 A 3/2010
(Continued)

*Primary Examiner* — Paul N Dickson
*Assistant Examiner* — Timothy Wilhelm
(74) *Attorney, Agent, or Firm* — Oliff PLC

(57) ABSTRACT

The present disclosure provides an occupant protection device including: side support sections pair provided at a seat width direction left and right of a seatback; an outside bag body, provided inside an outside side support section out of the side support sections pair which is disposed at a window section side, that displaces the outside side support section by gas being supplied to and inflating an interior portion of the outside bag body; an inside bag body, provided inside an inside side support section out of the side support sections pair which is disposed at opposite side of the outside side support section, that displaces the inside side support section by gas being supplied to and inflating an interior portion of the inside bag body; and a communicating connection member that places the outside bag body and the inside bag body in communication.

3 Claims, 8 Drawing Sheets

(51) Int. Cl.
*B60R 21/231* (2011.01)
*B60R 21/00* (2006.01)

(52) U.S. Cl.
CPC .............. *B60R 2021/0006* (2013.01); *B60R 2021/0023* (2013.01); *B60R 2021/23107* (2013.01); *B60R 2021/23146* (2013.01)

(56) References Cited

U.S. PATENT DOCUMENTS

| | | | | |
|---|---|---|---|---|
| 4,589,695 A * | 5/1986 | Isono | .............. | A47C 7/022 297/284.11 |
| 4,965,899 A * | 10/1990 | Sekido | .............. | B60N 2/665 297/284.11 |
| 5,137,329 A * | 8/1992 | Neale | .............. | A47C 7/467 297/284.1 |
| 5,280,997 A * | 1/1994 | Andres | .............. | A47C 7/467 297/284.6 |
| 5,707,109 A * | 1/1998 | Massara | .............. | B60N 2/4415 297/284.9 |
| 6,037,731 A * | 3/2000 | Fruehauf | .............. | B60N 2/0244 297/284.1 |
| 6,129,419 A * | 10/2000 | Neale | .............. | B60N 2/4415 297/284.4 |
| 7,708,343 B2 * | 5/2010 | Kayumi | .............. | B60N 2/4415 297/284.9 |
| 8,011,729 B2 * | 9/2011 | Petzel | .............. | B60N 2/4415 297/284.1 |
| 8,136,883 B2 * | 3/2012 | Rehfuss | .............. | B60N 2/449 297/284.6 |
| 8,459,690 B2 * | 6/2013 | Breuninger | .............. | B60R 21/207 280/730.2 |
| 8,474,862 B2 * | 7/2013 | Pursche | .............. | B60R 21/0134 280/729 |
| 8,702,120 B2 * | 4/2014 | Kalisz | .............. | B60R 21/207 180/271 |
| 9,045,063 B2 * | 6/2015 | Line | .............. | B60N 2/449 |
| 9,358,909 B2 * | 6/2016 | Jeong | .............. | B60N 2/4415 |
| 9,393,891 B2 * | 7/2016 | Beier | .............. | B60N 2/4492 |
| 2007/0057551 A1 * | 3/2007 | Lachenmann | .............. | B60N 2/4492 297/284.9 |
| 2008/0191532 A1 * | 8/2008 | Wain | .............. | B60N 2/4415 297/284.1 |
| 2010/0090448 A1 | 4/2010 | Pursche et al. | | |

FOREIGN PATENT DOCUMENTS

| | | |
|---|---|---|
| JP | 2010-521351 A | 6/2010 |
| JP | 2015-058750 A | 3/2015 |
| JP | 2015-096403 A | 5/2015 |

* cited by examiner

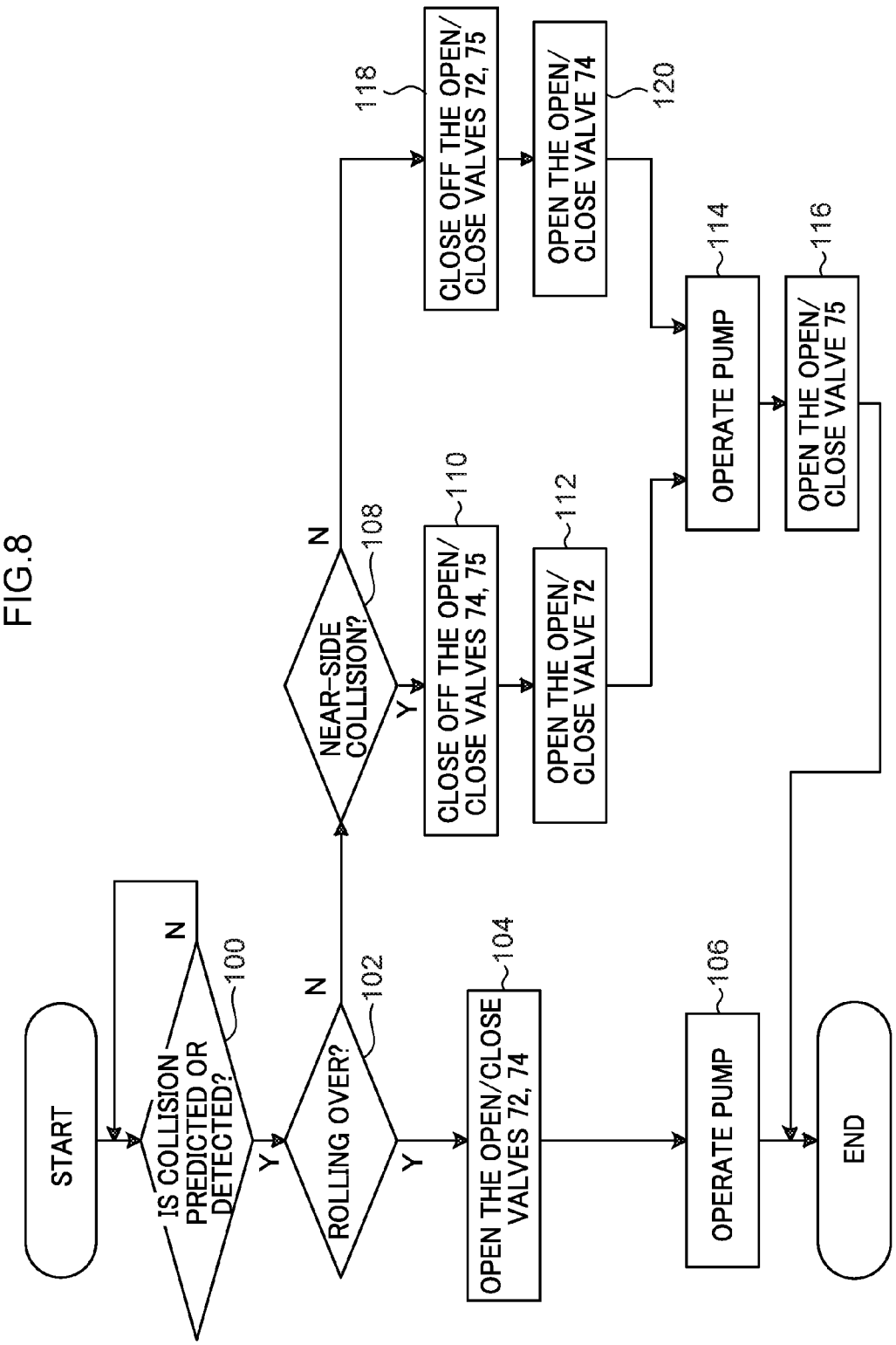

OCCUPANT PROTECTION DEVICE

CROSS-REFERENCE TO RELATED APPLICATION

This application claims priority under 35 USC 119 from Japanese Patent Application No. 2015-153279 filed on Aug. 3, 2015, the disclosure of which is incorporated by reference herein.

BACKGROUND

Technical Field

The present disclosure relates to an occupant protection device.

Related Art

In a vehicle occupant restraint device disclosed in Japanese Patent Application Laid-Open (JP-A) No. 2010-64632, an air bag disposed inside a side support section is inflated, and relative displacement of a seated occupant in the seat width direction with respect to the seat is suppressed due to the side support section extending out to a vehicle front side, in cases in which acceleration acts in at least the vehicle width direction, such as in what is referred to as an offset collision, side-on collision (side collision), or the like.

Normally, when a collision or the like is not predicted, the side support sections hold the upper body of the seated occupant in the seat width direction, and suppress relative displacement of the seated occupant in the seat width direction, due to the respective side support sections displacing toward a seat width direction central portion of the seat.

However, generally, side support sections are configured such that the left and right are separately adjusted, such that it is necessary to finely adjust their respective pressures in order to substantially equalize the pressures of the side support sections at the left side and the right side, and so there is room for further improvement.

SUMMARY

The present disclosure provides an occupant protection device that may substantially equalizing the pressures of a pair of side support sections, simply.

An occupant protection device of a first aspect includes: a pair of side support sections provided at a seat width direction left and right of a seatback of a vehicle; an outside bag body, provided inside an outside side support section out of the pair of side support sections which is disposed at a window section side of the vehicle, that displaces the outside side support section by gas being supplied to and inflating an interior portion of the outside bag body; an inside bag body, provided inside an inside side support section out of the pair of the side support sections which is disposed at opposite side of the outside side support section, that displaces the inside side support section by gas being supplied to and inflating an interior portion of the inside bag body; and a communicating connection member that places the outside bag body and the inside bag body in communication with each other.

In the occupant protection device of the first aspect, the outside bag body is provided inside the outside side support section, out of the pair of side support sections provided at the seat width direction left and right of the seatback of the vehicle which is disposed at the window section side of the vehicle. The outside bag body displaces the outside side support section by gas being supplied to, and inflating, the interior portion of the outside bag body.

Among the side support sections, the inside bag body, which is disposed at the opposite side to the outside side support section, is provided inside the inside side support section. The inside bag body displaces the inside side support section by gas being supplied to, and inflating, the interior portion of the inside bag body.

In this manner, the occupant protection device of the first aspect may adjust hold performance of the seated occupant in the seat width direction by displacement of the side support sections provided at the seat width direction left and right of the seatback. The occupant protection device of the first aspect is provided with the communicating connection member that places the outside bag body and the inside bag body in communication with each other. In the occupant protection device of the first aspect, the pressure in the outside bag body and the pressure in the inside bag body can accordingly be substantially equalized, simply, through the communicating connection member, even in a case in which the pressure in the outside bag body and the pressure in the inside bag body differ as a result of, for example, occupant operation during everyday use.

A second aspect, in the above first aspect, may further include: a crash safety sensor that predicts or detects a collision of the vehicle; and a controller that supplies gas to the bag body out of the outside bag body and the inside bag body which is disposed at a side near to a collision position, based on a result of a prediction or detection by the crash safety sensor.

The occupant protection device of the second aspect includes the crash safety sensor that predicts or detects a collision. Gas is supplied to the bag body (the inside bag body or outside bag body) at the side (collision side) near the collision position by the controller based on the results of a collision predicted or detected by the crash safety sensor.

As described above, in a case in which the inside bag body (or outside bag body) is supplied with gas, the inside bag body (or outside bag body), which is inflated (expands) during everyday use, further inflates, such that a pressure difference between the pressure in the inside bag body and the pressure in the outside bag body arises. In the occupant protection device of the second aspect, gas flows between the inside bag body and the outside bag body through the communicating connection member. The occupant protection device of the second aspect may substantially equalizing the pressure in the inside bag body and the pressure in the outside bag body at an early stage, whichever one the gas is supplied to.

Note that examples of "collisions" include head-on collisions such as offset collisions and oblique collisions, side-on collisions (side collisions), and rollovers.

In a third aspect, in the above aspects, may further include an open/close valve provided so as to be capable of opening or closing between the outside bag body and the inside bag body, and that, by opening, places the outside bag body and the inside bag body in communication with each other through the communicating connection member.

In the occupant protection device of the third aspect, the open/close valve is provided so as to be capable of opening or closing between the outside bag body and the inside bag body. The outside bag body and the inside bag body are placed in communication through the communicating connection member by opening the open/close valve. The occupant protection device of the third aspect may substantially equalize the pressure in the outside bag body and the pressure in the inside bag body.

The pressure in the outside bag body and the pressure in the inside bag body can be varied by closing off the open/close valve to cut off the outside bag body from the inside bag body. In the occupant protection device of the third aspect, in a case in which, due to prediction or detection of a collision, gas is supplied to one the outside bag body or the inside bag body, the bag body may be effectively inflated since gas does not flow to the other through the communicating connection member.

A fourth aspect, in the above aspects, may further include: a pump disposed inside the inside side support section; an outside bag body connection member, connected to the pump and the outside bag body, that supplies gas from the pump to the outside bag body; and an inside bag body connection member, connected to the pump and the inside bag body, that supplies gas from the pump to the inside bag body, wherein the cross-sectional area of a flow path of the communicating connection member is set smaller than the cross-sectional area of a flow path of the outside bag body connection member and the cross-sectional area of a flow path of the inside bag body connection member.

In the occupant protection device of the fourth aspect, the pump is disposed inside the inside side support section. The pump is connected to the outside bag body using the outside bag body connection member, and gas from the pump is supplied to the outside bag body through the outside bag body connection member. The pump is also connected to the inside bag body using the inside bag body connection member, and gas from the pump is supplied to the inside bag body through the inside bag body connection member.

For example, in similar tube bodies, at the same flow speed, the flow rate of gas flowing in the tube body becomes larger the larger the flow path cross-sectional area of the tube body. In the occupant protection device of the fourth aspect, the cross-sectional area of the flow path of the communicating connection member is set smaller than the cross-sectional area of the flow path of the outside bag body connection member and the cross-sectional area of the flow path of the inside bag body connection member.

In the occupant protection device of the fourth aspect, the flow rate of gas flowing in the outside bag body connection member and the inside bag body connection member is higher than the flow rate of gas flowing in the communicating connection member, such that in a case in which gas is supplied by the pump, the gas supply to the outside bag body and the inside bag body is prioritized, such that the outside bag body and the inside bag body are made to inflate at an early stage. Moreover, in the occupant protection device of the fourth aspect, gas flows more slowly in the communicating connection member than in the outside bag body connection member and the inside bag body connection member, corresponding to the ratio with the flow path cross-sectional area of the outside bag body connection member and the flow path cross-sectional area of the inside bag body connection member.

As explained above, the occupant protection device of the first aspect may simply substantially equalize the pressure in the pair of side support sections.

The occupant protection device of the second aspect may substantially equalize the pressure in the outside bag body and the pressure in the inside bag body, simply by the passing of time, even in a case in which gas is supplied to either the outside bag body or the inside bag body due to prediction or detection of a collision.

The occupant protection device of the third aspect may place the outside bag body and the inside bag body in communication with each other by opening the open/close valve, and may cut off the outside bag body from the inside bag body by closing the open/close valve.

The occupant protection device of the fourth aspect may inflate the outside bag body or the inside bag body at an early stage in a case in which a collision is predicted or detected, and then may substantially equalizing the pressure of the outside bag body and the pressure of the inside bag body gradually.

BRIEF DESCRIPTION OF THE DRAWINGS

Exemplary embodiments will be described in detail based on the following figures, wherein:

FIG. 8 is a flow chart illustrating a control method of an occupant protection device according to the present exemplary embodiment.

DETAILED DESCRIPTION

Explanation follows regarding an occupant protection device according to an exemplary embodiment of the present disclosure with reference to the drawings. Note that in the respective drawings, the arrow FR, the arrow UP, and the arrow OUT respectively indicate the front direction, the upward direction, and a vehicle width direction outside direction of a vehicle applied with an occupant protection device according to an exemplary embodiment of the present disclosure as appropriate. In the present exemplary embodiment, the front-rear, left-right, and up-down directions of a vehicle seat applied with the occupant protection device match the front-rear, left-right, and up-down directions of the vehicle.

Figure 1:
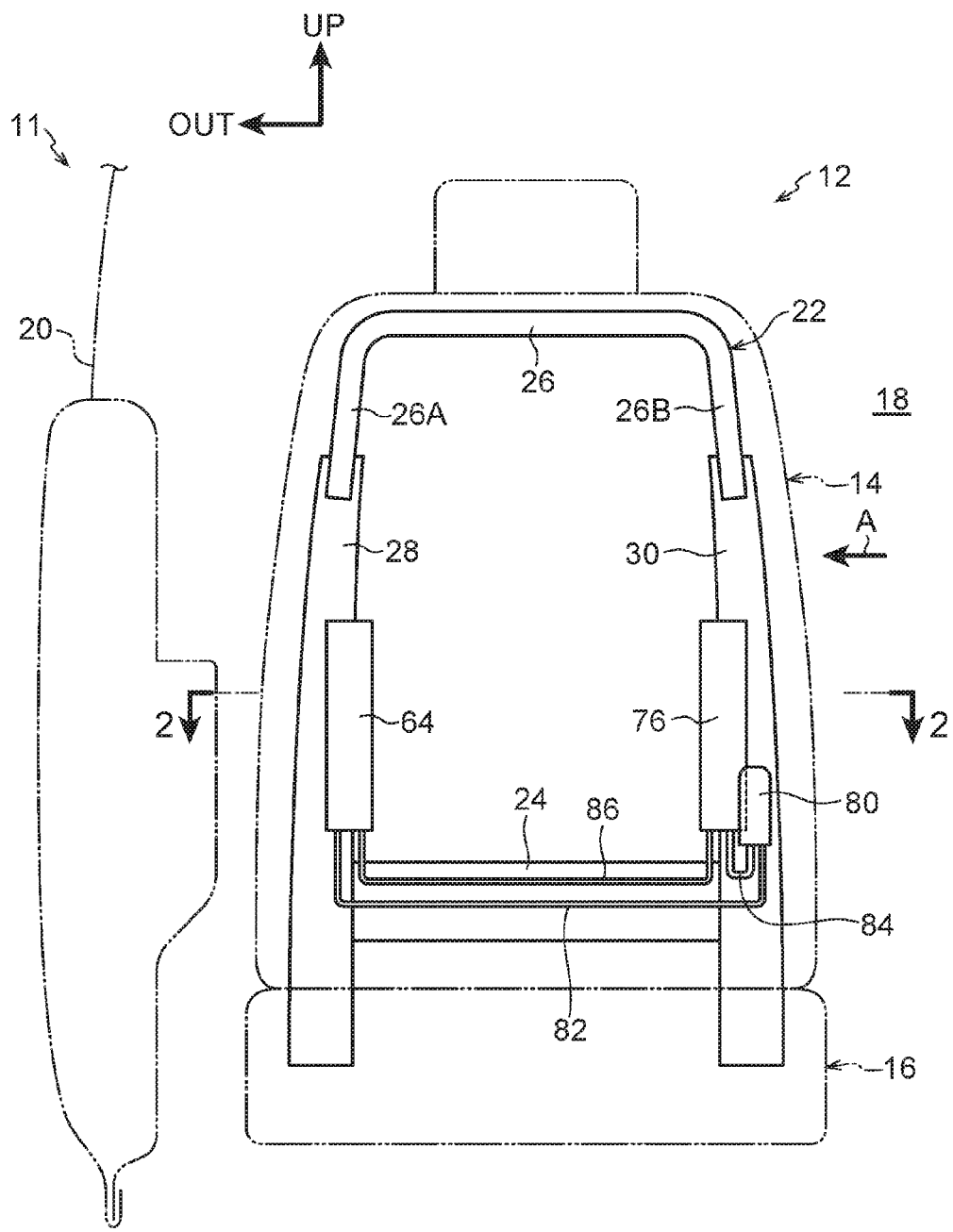
FIG. 1 is a back face view schematically illustrating an occupant protection device according to an exemplary embodiment.

First, explanation follows regarding configuration of an occupant protection device according to the present exemplary embodiment. FIG. 1 illustrates a back face view of a vehicle seat 12 applied with an occupant protection device 10 according to the present exemplary embodiment. A seatback 14 is provided to the vehicle seat 12, and the seatback 14 is coupled to a rear end portion of a seat cushion 16 so as to support the back of an occupant seated on the seat cushion 16 (referred to below as "seated occupant").

Note that here, the left side of a vehicle cabin interior 18 of a vehicle 11 configures a window section 20 side (outside) of the vehicle seat 12, and the vehicle seat 12 is disposed on the left side of the vehicle cabin interior 18. However, the vehicle seat 12 may be disposed on the right side of the vehicle cabin interior 18. In such cases, the vehicle seat 12 would be configured with left-right symmetry with respect to the present exemplary embodiment.

The seatback 14 of the vehicle seat 12 includes a seat frame 22 formed of metal. The seat frame 22 has a substantially rectangular shape, and includes a lower frame section 24 disposed at a lower portion of the seat frame 22 and extending along the width direction of the seatback 14, and an upper frame section 26 disposed at an upper portion of the seat frame 22 and extending along the width direction of the seatback 14. Bent portions 26A, 26B are formed bending toward the lower side at both length direction end portions of the upper frame section 26. A left frame section 28 joins the bent portion 26A of the upper frame section 26 to the lower frame section 24, and is disposed on the left side of the vehicle seat 12 running along the up-down direction of the seatback 14. Moreover, a right frame section 30 joins the bent portion 26B to the lower frame section 24 and is disposed on the right side of the vehicle seat 12 running along the up-down direction of the seatback 14.

Note that in the present exemplary embodiment, seatback 14 is provided with the seat frame 22 configured by the lower frame section 24, the upper frame section 26, the left frame section 28, and the right frame section 30. However, there is no limitation thereto. For example, although not illustrated in the drawings, the seatback 14 may be provided with what is referred to as a shell frame having a shell shape open to the seat front side.

As described above, the vehicle seat 12 here is disposed on the left side of the vehicle cabin interior 18, such that the left side of the vehicle cabin interior 18 is the window section 20 side from the perspective of the vehicle seat 12. For convenience of explanation hereafter, the left frame section 28 is accordingly referred to as the outside frame section 28, and the right frame section 30 is referred to as the inside frame section 30. Moreover, members disposed to the left and right of the vehicle seat 12 described below are also respectively referred to as being on the outside and on the inside, similarly to the frame.

Figure 2:
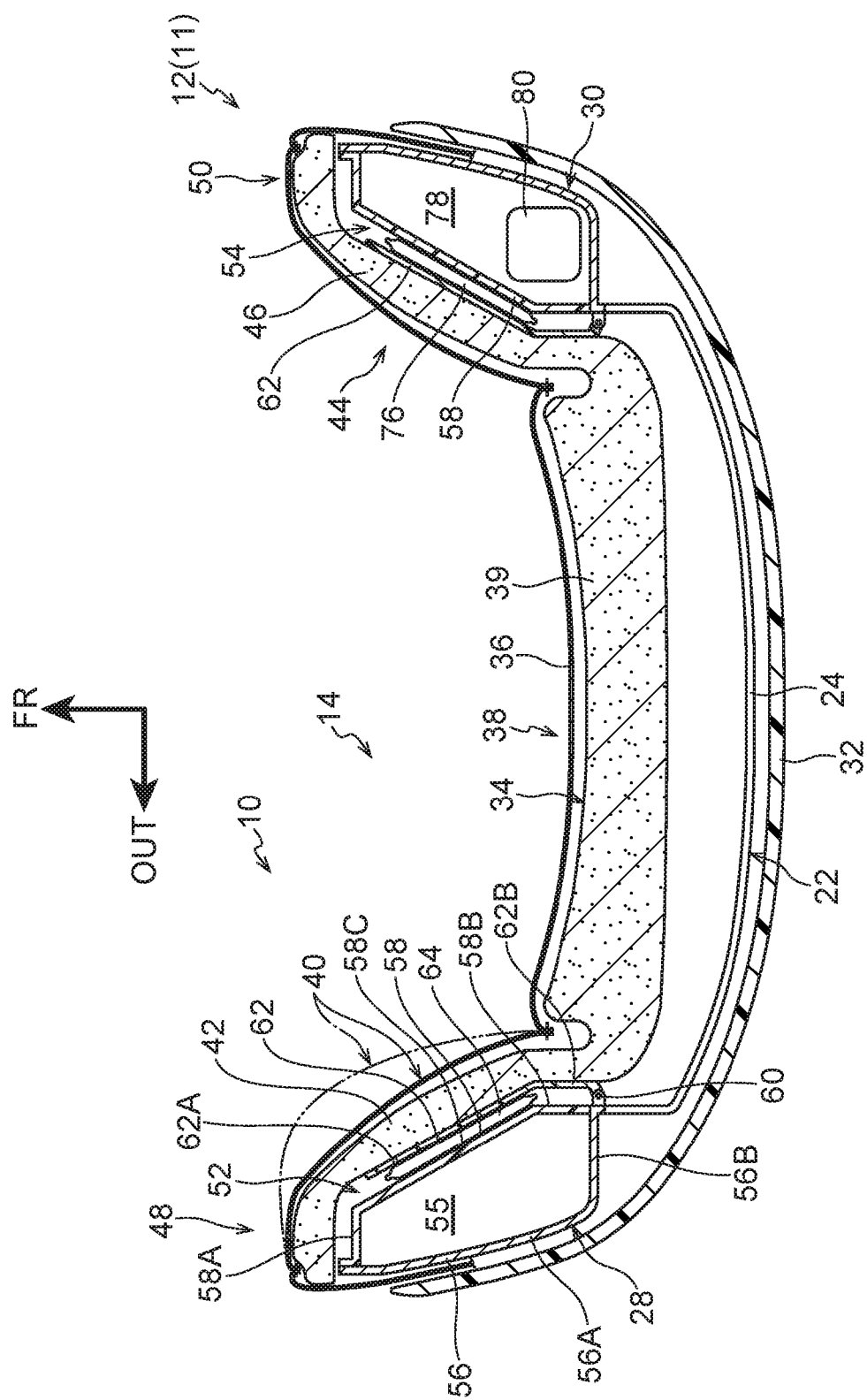
FIG. 2 is a cross-section sectioned along line 2-2 in FIG. 1.
Figure 3:
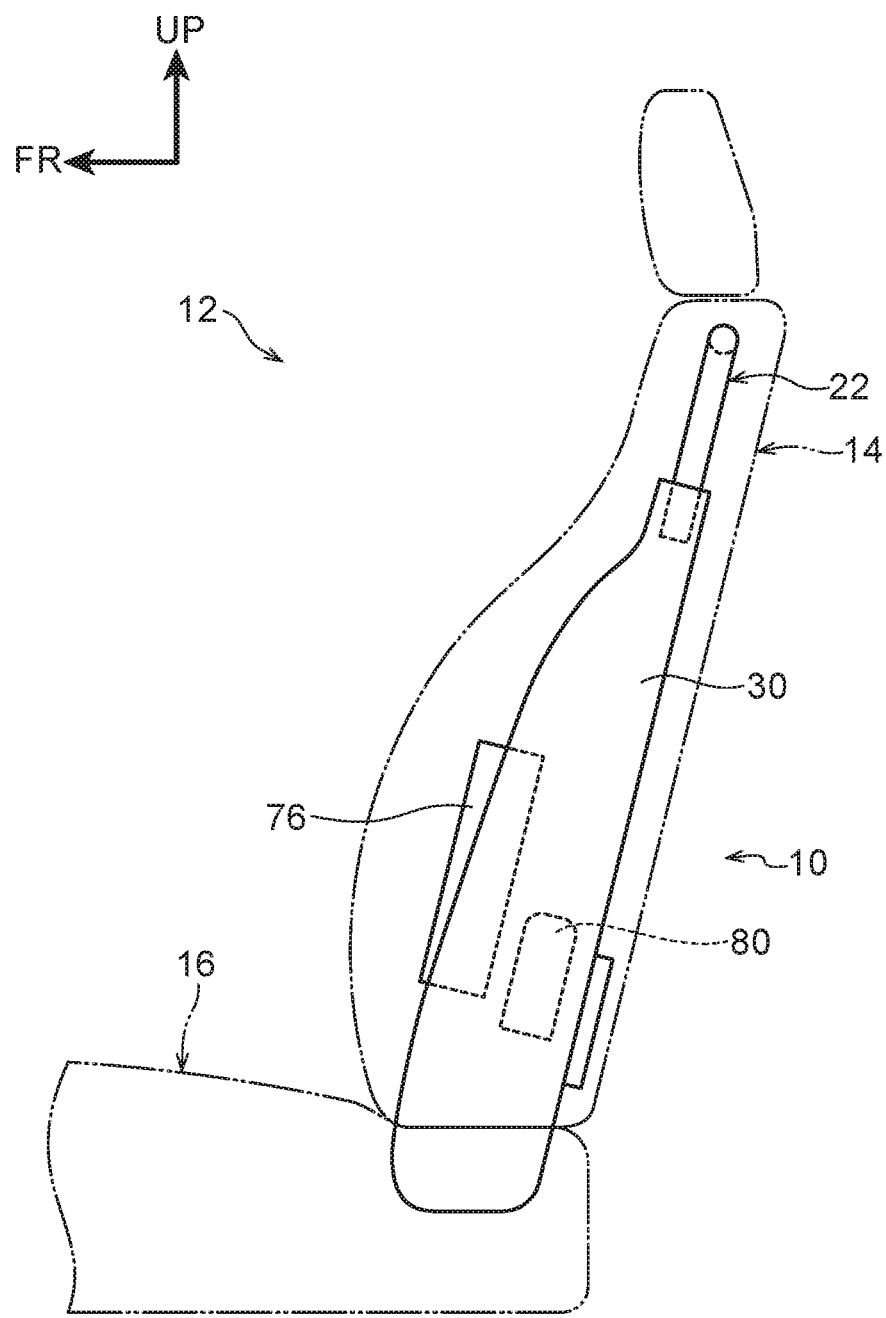
FIG. 3 is a side view as viewed along the arrow A direction in FIG. 1.

As illustrated in FIG. 2, the seat frame 22 is covered from the seat rear side and both seat width direction outsides by a back board 32 made of resin. A seatback pad 34, this being a cushion member made of urethane, is attached to the seat front side of the seat frame 22. The seatback pad 34 is covered from the seat front side by a seatback covering 36, this being a covering member.

The above-mentioned seatback 14 includes a seatback main body 38 that supports the back of the seated occupant from the seat rear side, and is provided with an outside side support section 40 at the seat width direction left side of the seatback main body 38. Moreover, an inside side support section 44 is provided at the seat width direction right side of the seatback main body 38. The outside side support section 40 and the inside side support section 44 are configured protruding out further to the seat front side than the seatback main body 38 so as to support the upper body of the seated occupant from the sides.

The seatback pad 34 also includes a seatback pad main body 39 provided to the seatback main body 38, and an outside side pad portion 42 is provided inside the outside side support section 40 on the seat width direction left side of the seatback pad main body 39. An inside side pad portion 46 is also provided inside the inside side support section 44 on the seat width direction right side of the seatback pad main body 39. The outside side pad portion 42 and the inside side pad portion 46 extend from seat width direction outside end portions of the seatback pad main body 39 obliquely toward the seat front side and the seat width direction outsides.

In the present exemplary embodiment, an outside side support section adjustment mechanism 48 is disposed between the outside frame section 28 and the outside side pad portion 42, and an inside side support section adjustment mechanism 50 is disposed between the inside frame section 30 and the inside side pad portion 46. The outside side support section adjustment mechanism 48 includes a mechanism unit 52, and part of the mechanism unit 52 is configured by the outside frame section 28. The inside side support section adjustment mechanism 50 also includes a mechanism unit 54, similarly to the outside side support section adjustment mechanism 48, and part of the mechanism unit 54 is configured by the inside frame section 30.

Note that the mechanism unit 52 of the outside side support section adjustment mechanism 48 and the mechanism unit 54 of the inside side support section adjustment mechanism 50 have substantially the same configuration as each other, and so representative explanation here is mainly regarding the mechanism unit 52 of the outside side support section adjustment mechanism 48. Moreover, locations of the mechanism unit 54 of the inside side support section adjustment mechanism 50 for which explanation is omitted are appended with the same reference numerals as in the mechanism unit 52.

As illustrated in FIG. 2, the outside frame section 28 that configures part of the mechanism unit 52, has a substantially rectangular shape in plan cross-section view. The outside frame section 28 is configured with an outside wall 56 provided at the vehicle width direction outside of the outside frame section 28, and an inside wall 58 provided at the seat width direction inside of the outside frame section 28. A space 55, formed so as to gradually narrow on progression toward the front side, is provided inside of the outside frame section 28.

The outside wall 56 has a substantially L-shape in plan cross-section view, and is configured by a longitudinal wall portion 56A disposed running along the vehicle front-rear direction and a lateral wall portion 56B disposed running along the vehicle width direction. Moreover, the inside wall 58 is configured including a lateral wall portion 58A disposed running along the vehicle width direction at a front portion of the inside wall 58 and formed shorter than the lateral wall portion 56B of the outside wall 56, and a longitudinal wall portion 58B disposed running along the vehicle front-rear direction at a rear portion of the inside wall 58 and formed shorter than the longitudinal wall portion 56A. The inside wall 58 also includes a support wall 58C that joins the longitudinal wall portion 58B and the lateral wall portion 58A together, and the support wall 58C is inclined from a front end portion of the longitudinal wall portion 58B toward the vehicle width direction outside on progression toward the front side.

A hinge portion 60 is provided to a seat width direction central side of the outside frame section 28. A movable plate 62 is attached to the hinge portion 60 at the seat width direction central portion side of the outside frame section 28, and is capable of swinging along the vehicle width direction. The movable plate 62 configures another part of the mechanism unit 52, and is formed with substantially the same shape as the support wall 58C and the longitudinal wall portion 58B of the inside wall 58. The movable plate 62 is separated from the inside wall 58 and is configured including a movable plate upper portion 62A and movable plate lower portion 62B, disposed substantially parallel to the support wall 58C and the longitudinal wall portion 58B, respectively.

Furthermore, the movable plate 62 abuts the outside side pad portion 42 and is provided with an outside bladder 64, serving as an outside bag body, between the inside wall 58 of the outside frame section 28 and the movable plate 62. The movable plate 62 is pressed in a direction away from the inside wall 58 and swings about the hinge portion 60 toward the seat width direction central side by inflation of the outside bladder 64.

As described above, as illustrated in FIG. 6, due to the movable plate 62 abutting the outside side pad portion 42, the outside side pad portion 42 is pressed by the movable plate 62 and displaces toward the seat width direction central side of the vehicle seat 12 due to the movable plate 62 swinging toward the seat width direction central side.

Figure 4:
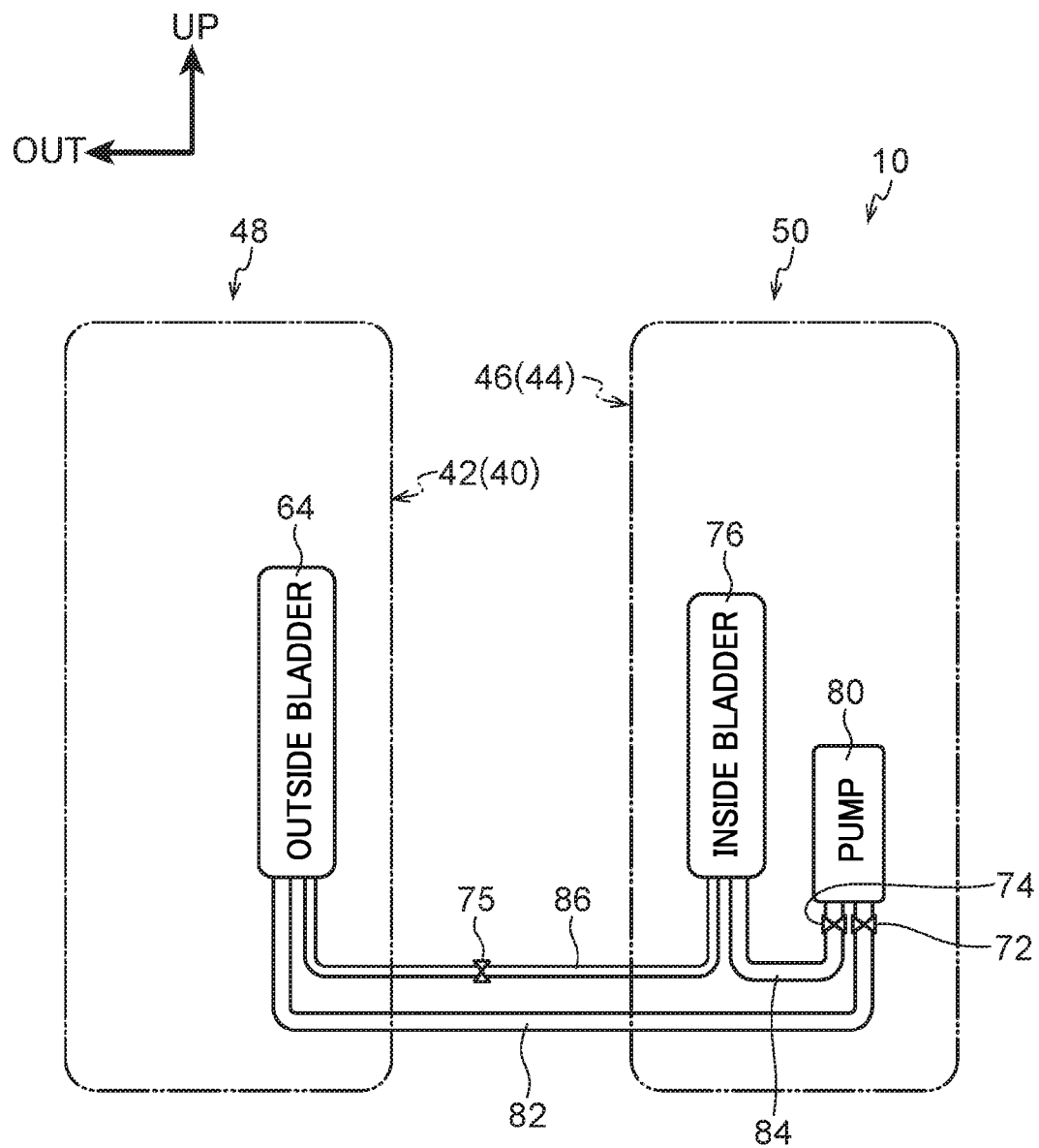
FIG. 4 is a configuration diagram schematically illustrating configuration of an occupant protection device according to the present exemplary embodiment.
Figure 5:
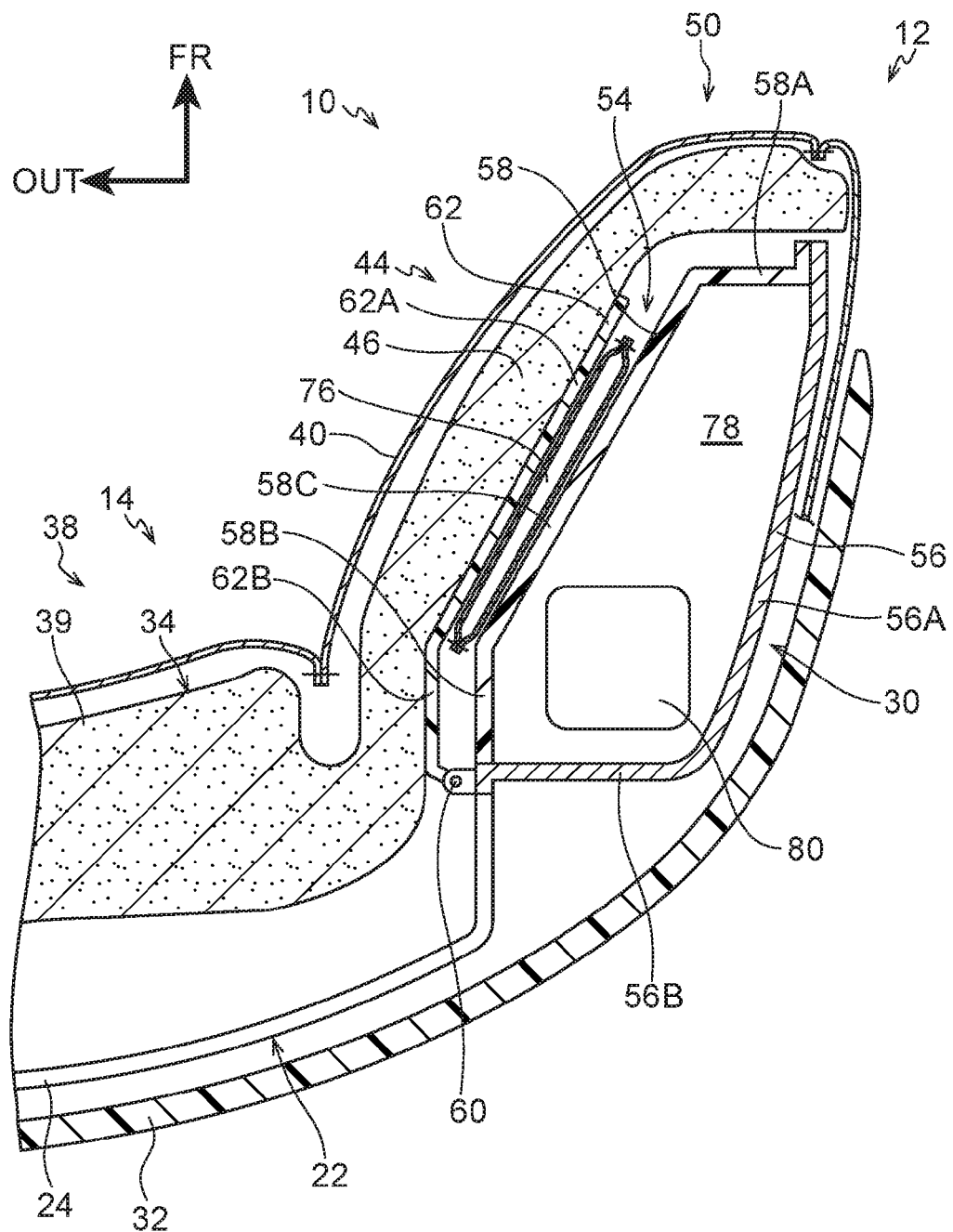
FIG. 5 is an enlarged cross-section of relevant portions in which part of FIG. 2 is enlarged, illustrating a state in which an outside bladder configuring a portion of an occupant protection device according to the present exemplary embodiment is not inflated.

As illustrated in FIG. 2, the inside side pad portion 46 is provided corresponding to the outside side pad portion 42. An inside bladder 76, serving as an inside bag body, is provided between the inside side pad portion 46 and the inside frame section 30. Moreover, a space 78 is formed inside the inside frame section 30. A pump 80 is disposed inside the space 78. As illustrated in FIG. 4, the pump 80 is connected to the outside bladder 64 through an outside bladder supply tube (outside bag body connection member) 82, and is connected to the inside bladder 76 through an inside bladder supply tube (inside bag body connection member) 84.

Specifically, one end portion of the outside bladder supply tube 82 is connected to the pump 80, and the other end portion of the outside bladder supply tube 82 is connected to the outside bladder 64. An open/close valve 72 is provided to the outside bladder supply tube 82 and, in an open state of the open/close valve 72, gas (air) is supplied to the outside bladder 64 through the outside bladder supply tube 82 by operating the pump 80.

Note that the open/close valve 72 here is provided to the outside bladder supply tube 82. However, there is no limitation to this configuration as long as the open/close valve 72 is provided between the pump 80 and the outside bladder 64. For example, the open/close valve 72 may be provided to either the pump 80 or to the outside bladder 64. Similarly to the open/close valve 72, open/close valves 74, 75, described later, do not necessarily have to be provided to the respective tubes.

One end portion of the inside bladder supply tube 84 is connected to the pump 80, and the inside bladder 76 is connected to the other end portion of the inside bladder supply tube 84. The open/close valve 74 is provided to the inside bladder supply tube 84, and in an open state of the open/close valve 74, gas is supplied to the inside bladder 76 through the inside bladder supply tube 84 by operating the pump 80.

A communicating tube (communicating connection member) 86 is connected to the outside bladder 64 and the inside bladder 76; one end portion of the communicating tube 86 is connected to the outside bladder 64, and the other end portion of the communicating tube 86 is connected to the inside bladder 76. The open/close valve 75 is provided to the communicating tube 86, and in an open state of the open/close valve 75, the outside bladder 64 and the inside bladder 76 are placed in communication with each other via the communicating tube 86.

Note that, in the present exemplary embodiment, the flow path cross-sectional area (A1) of the communicating tube 86 is set smaller than the flow path cross-sectional area (A2) of the outside bladder supply tube 82 and the flow path cross-sectional area (A3) of the inside bladder supply tube 84 (A1<A2, A1<A3).

Figure 7:
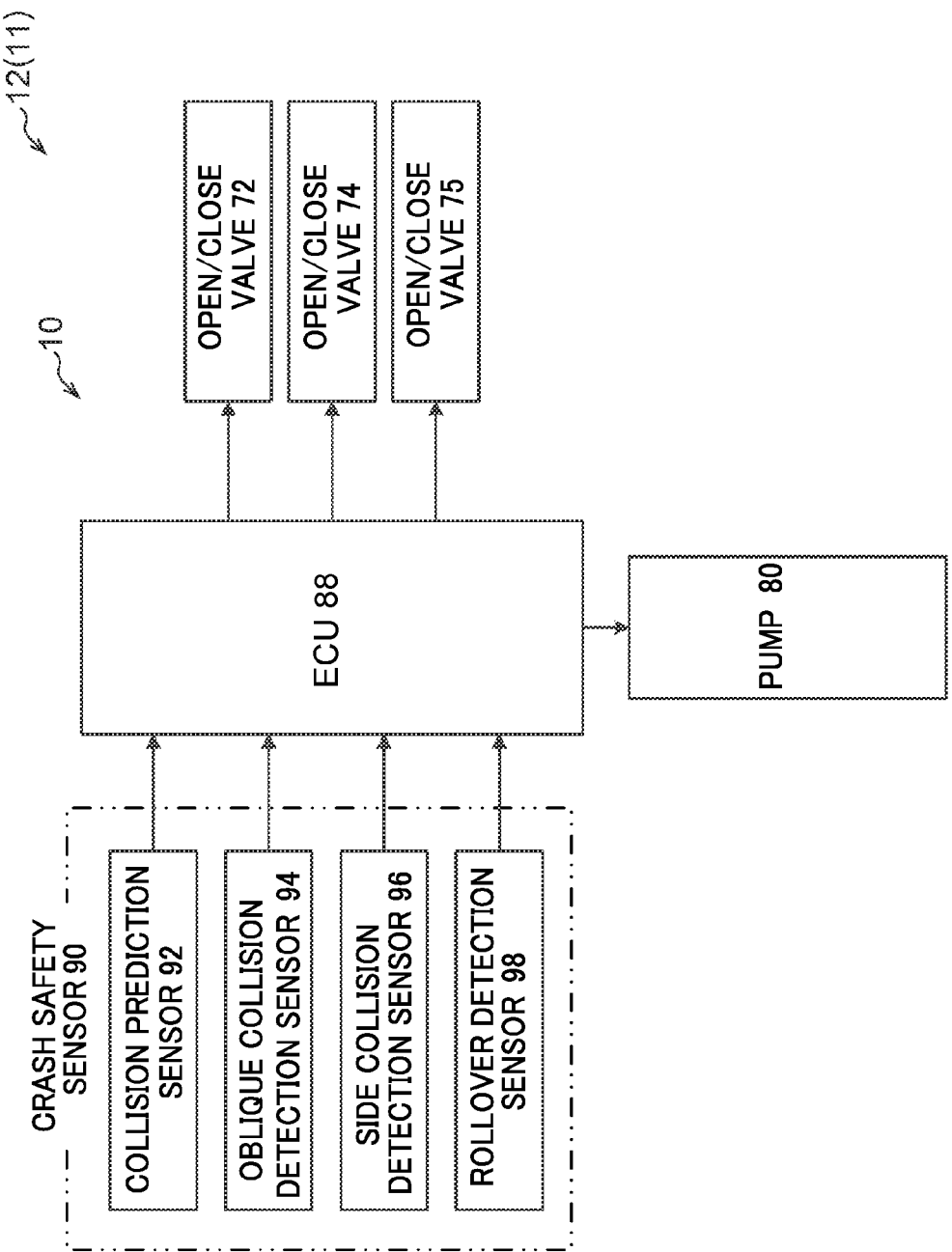
FIG. 7 is a block diagram illustrating configuration of an occupant protection device according to the present exemplary embodiment.

As illustrated in FIG. 7, an ECU (controller) 88 installed to the vehicle 11 is electrically connected to the pump 80. A collision prediction sensor 92, an oblique collision detection sensor 94, a side collision detection sensor 96, and a rollover detection sensor 98, each serving as a crash safety sensor 90, are electrically connected to the ECU 88. Here, "collision" refers to head-on collisions such as what are called offset collisions and oblique collisions, side-on collisions (side collisions), and rollovers.

Although not illustrated in the drawings, the collision prediction sensor 92 is configured so as to output an oblique collision prediction signal to the ECU 88 (see FIG. 7) in cases in which the possibility of an oblique head-on collision (oblique collision) between the vehicle and another vehicle occurring has arisen. The collision prediction sensor 92 is also configured so as to output a side collision prediction signal to the ECU 88 in cases in which the possibility of a side-on collision (side collision) between the vehicle and another vehicle occurring has arisen. Furthermore, the collision prediction sensor 92 is configured so as to output a rollover prediction signal to the ECU 88 in cases in which the possibility has arisen of the vehicle rolling over. Note that a milliwave radar, a camera, or the like, may be employed as the collision prediction sensor 92.

The oblique collision detection sensor 94 illustrated in FIG. 7 is configured so as to output an oblique collision detection signal to the ECU 88 in cases in which an oblique collision of the vehicle 11 has occurred, and the side collision detection sensor 96 is configured so as to output a side collision detection signal to the ECU 88 in cases in which a side collision of the vehicle 11 has occurred. Moreover, the rollover detection sensor 98 is configured so as to output a rollover detection signal to the ECU 88 in cases in which a rollover of the vehicle 11 has occurred. Note that accelerometers or the like may be employed as the oblique collision detection sensor 94 and the side collision detection sensor 96, and a gyroscope may be employed as the rollover detection sensor 98. The open/close valves 72, 74, 75 are each electrically connected to the ECU 88, and the open/close valves 72, 74, 75 are capable of opening and closing.

As described above, in the present exemplary embodiment, opening and closing of the open/close valves 72, 74, 75 is controlled using the ECU 88 according to the collision mode of the vehicle 11 detected by the crash safety sensor 90. Note that "collision modes" here encompass cases in which a collision with a colliding body has been predicted or detected on the side nearer the seated occupant in question (near-side collision), cases in which a collision with a colliding body has been predicted or detected on the side further away from the seated occupant (far-side collision), vehicle rollovers, and the like. For example, in the present exemplary embodiment, the vehicle seat 12 disposed on the vehicle left side is taken as a reference. Cases in which the colliding body collides to the left side of the vehicle 11 are near-side collisions, and cases in which the colliding body collides to the right side of the vehicle 11 are far-side collisions.

Next, explanation follows regarding operation and advantageous effects of the occupant protection device according to the present exemplary embodiment.

In the present exemplary embodiment, in everyday use, when a collision has not been predicted, gas (air) is supplied into the inside bladder 76 and the outside bladder 64 when the pump 80 is operated by a switch or the like (not illustrated in the drawings) provided to the vehicle seat 12 illustrated in FIG. 1 and FIG. 2. The inside bladder 76 and the outside bladder 64 are each thereby inflated when gas is supplied into the inside bladder 76 and outside bladder 64 by operating the pump 80.

Figure 6:
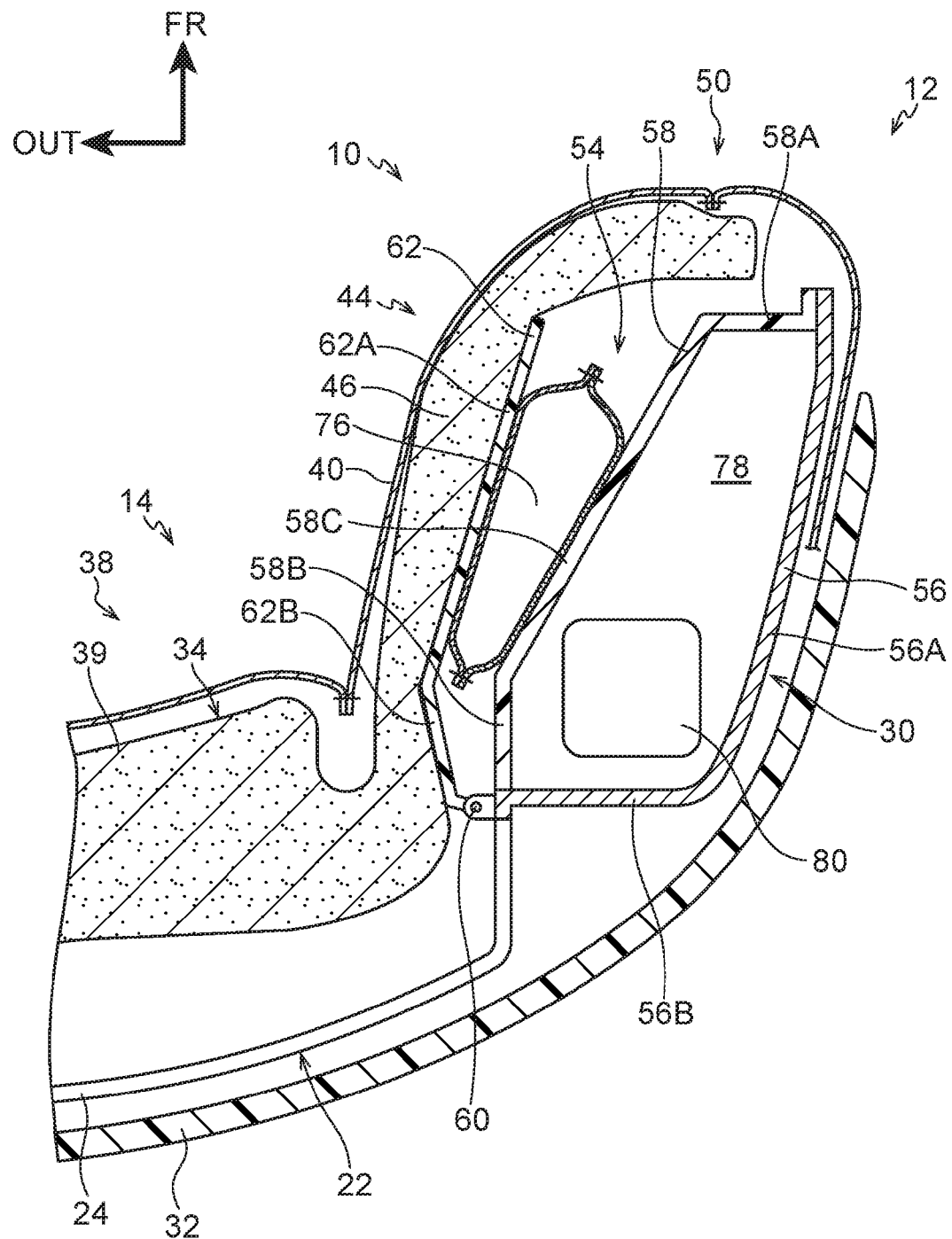
FIG. 6 is an enlarged cross-section of relevant portions in which part of FIG. 2 is enlarged, illustrating a state in which an outside bladder configuring a portion of an occupant protection device according to the present exemplary embodiment is inflated.

The movable plates 62 inside the inside side support section 44 and the outside side support section 40 are thereby pressed toward the direction away from the inside walls 58 (see FIG. 6). The inside side pad portion 46 and the outside side pad portion 42 are then each displaced toward the seat width direction central side of the vehicle seat 12 through the movable plates 62, thereby enabling adjustment of hold performance of the seated occupant in the seat width direction.

Note that discharge valves, not illustrated in the drawings, are respectively provided to the inside bladder 76 and the outside bladder 64, and gas in the inside bladder 76 and the outside bladder 64 is capable of being discharged by opening the discharge valves. This thereby enables a holding force on the seated occupant to be reduced using the inside side pad portion 46 and the outside side pad portion 42, enabling fine adjustment of the hold performance of the seated occupant.

As illustrated in FIG. 4, the present exemplary embodiment is provided with the communicating tube 86 that places the outside bladder 64 and the inside bladder 76 in communication with each other, and the open/close valve 75 is normally open when a collision has not been predicted or detected. Normally, in a case in which a collision has not been predicted or detected, gas is supplied into the outside bladder 64 or the inside bladder 76 when the pump 80 is operated by a switch (not illustrated in the drawings) or the like, and the pressure in the outside bladder 64 and the pressure in the inside bladder 76 can be substantially equalized through the communicating tube 86, simply by the passing of time. The seated occupant who is relatively displaced with respect to the vehicle seat 12 in the seat width direction can thereby be held with substantially the same pressure by the outside side pad portion 42 and the inside side pad portion 46.

However, in a case in which a collision has been predicted or detected by the crash safety sensor 90 (see FIG. 7), the pump 80 operates and controls opening and closing of the open/close valves 72, 74. The bag body (the outside bladder 64 or the inside bladder 76) on the side near the collision position (collision side) can thereby be made to (further) inflate earlier. The side support section on the collision side can thereby be made to displace toward the seat width direction central side of the vehicle seat 12 earlier due to inflating the bag body. Relative displacement of the seated occupant in the seat width direction can thereby be suppressed. Namely, in the present exemplary embodiment, relative displacement of the seated occupant along the seat width direction may be effectively suppressed in a collision that has at least some acceleration component in the vehicle width direction.

Specific explanation follows regarding an example of a control method of the present exemplary embodiment based on the flow chart illustrated in FIG. 8, with reference to FIG. 4 and FIG. 7. As illustrated in FIG. 8, at step 100, the crash safety sensor 90 determines whether or not a collision has been predicted or detected, and this determination is repeatedly executed until a collision is predicted or detected. Processing proceeds to step 102 in a case in which determination is made at step 100 that a collision has been predicted or detected.

At step 102, the rollover detection sensor 98 determines whether or not the vehicle 11 is rolling over. Processing proceeds to step 104 in a case in which determination is made at step 102 that the vehicle 11 is rolling over. At step 104, the open/close valves 72, 74 are opened.

Normally, in a case in which a collision has not been predicted or detected, the outside bladder 64 and the inside bladder 76 becomes in communication with each other through the communicating tube 86, and the open state of the open/close valve 75 is maintained. In addition to the already open open/close valve 75, in step 104, the open/close valves 72, 74 are in an open state. In a case in which the open/close valve 72 is opened, the pump 80 and the outside bladder 64 becomes in communication with each other through the outside bladder supply tube 82, and in a case in which the open/close valve 74 is opened, the pump 80 and the inside bladder 76 becomes in communication with each other through the inside bladder supply tube 84.

Next, the pump 80 is forcibly operated at step 106. Gas is thereby supplied to the outside bladder 64 and the inside bladder 76, such that the outside bladder 64 and the inside bladder 76 are further inflated. As a result, the outside side pad portion 42 and the inside side pad portion 46 are displaced even further toward the seat width direction central side of the vehicle seat 12, such that relative displacement of the seated occupant in the seat width direction may be suppressed, and the seated occupant may be protected.

Note that the outside bladder 64 and the inside bladder 76 are in communication with each other through the communicating tube 86 due to opening the open/close valve 75. This enables the pressure in the outside bladder 64 and the pressure in the inside bladder 76 to be substantially equalized through the communicating tube 86 after the outside bladder 64 and the inside bladder 76 have inflated further. The seated occupant who is relatively displaced in the seat width direction with respect to the vehicle seat 12 may thereby be restrained with substantially the same pressure by the outside side pad portion 42 and the inside side pad portion 46.

Processing proceeds to step 108 in a case in which determination is made at step 102 that the vehicle 11 is not rolling over. At step 108, the oblique collision detection sensor 94 and the side collision detection sensor 96 determine whether or not the collision is a near-side collision. Processing proceeds to step 110 when the collision is determined at step 108 to be a near-side collision. At step 110, the open/close valves 74, 75 are closed off. The pump 80 and the inside bladder 76 are cut off from each other due to closing off the open/close valve 74, and the outside bladder 64 and the inside bladder 76 are cut off from each other due to closing off the open/close valve 75. Namely, the pressure in the outside bladder 64 and the pressure in the inside bladder 76 can thereby be varied.

Next, processing proceeds to step 112, and open/close valve 72 is opened. Accordingly, the pump 80 and the outside bladder 64 becomes in communication with each other. The pump 80 is forcibly operated at step 114. Gas is thereby supplied to the outside bladder 64, further inflating the outside bladder 64. As a result, the outside side pad portion 42 displaces even further toward the seat width direction central side of the vehicle seat 12, and relative displacement of the seated occupant toward the window section 20 side (see FIG. 1) is suppressed, such that the seated occupant is protected at an early stage.

Processing then proceeds to step 116 and the open/close valve 75 is opened. The outside bladder 64 and the inside bladder 76 are thereby placed in communication with each other through the communicating tube 86. At step 114, a pressure difference between the pressure in the outside bladder 64 and the pressure in the inside bladder 76 arises in a case in which the pump 80 is operated such that the outside bladder 64 is further inflated. In this state, in a case in which the open/close valve 75 is opened at step 116, gas flows from the outside bladder 64 to the inside bladder 76 through the communicating tube 86 such that the pressure in the outside bladder 64 and the pressure in the inside bladder 76 are substantially equalized.

At step 108, in a case in which determination is made that the collision is not a near-side collision, the collision is determined to be a far-side collision, and processing proceeds to step 118. At step 118, the open/close valves 72, 75 are closed off. The pump 80 and the outside bladder 64 are cut off from each other by closing off the open/close valve 72, and the outside bladder 64 and the inside bladder 76 are cut off from each other by closing off the open/close valve 75.

Next, processing proceeds to step 120, and the open/close valve 74 is opened. Accordingly, the pump 80 and the inside bladder 76 becomes in communication with each other. The pump 80 is forcibly operated at step 114. Gas is thereby supplied to the inside bladder 76 and the inside bladder 76 is further inflated. As a result, the inside side pad portion 46 further displaces toward the seat width direction central side of the vehicle seat 12, relative displacement of the seated occupant toward the opposite side to the window section 20 (see FIG. 1) is suppressed, and the seated occupant is protected at an early stage.

Processing then proceeds to step 116, and the open/close valve 75 is opened. The outside bladder 64 and the inside bladder 76 are thereby placed in communication with each other through the communicating tube 86. At step 114, a pressure difference between the pressure in the outside bladder 64 and the pressure in the inside bladder 76 arises in a case in which the pump 80 is operated and the inside bladder 76 is inflated. In this state, in a case in which the open/close valve 75 is opened at step 116, gas flows from the inside bladder 76 to the outside bladder 64 through the communicating tube 86 such that the pressure in the outside bladder 64 and the pressure in the inside bladder 76 are substantially equalized.

As described above, in the present exemplary embodiment, in cases in which a collision has been predicted or detected, the bladder positioned on the collision side out of the outside bladder 64 or the inside bladder 76, can be made to inflate early. Namely, the present exemplary embodiment may suppress relative displacement of the seated occupant in the seat width direction, and may protect the seated occupant, according to the collision mode of the vehicle 11.

In the present exemplary embodiment, the outside bladder 64 and the inside bladder 76 are placed in communication with each other through the communicating tube 86 by opening the open/close valve 75. Whichever one the gas is supplied to, from out of the outside bladder 64 or the inside bladder 76, the pressure in the outside bladder 64 and the pressure in the inside bladder 76 may be substantially equalized through the communicating tube 86, simply by the passing of time.

In particular, in a case in which one out of the outside bladder 64 or the inside bladder 76 is further inflated due to prediction or detection of a collision, obviously, a pressure difference between the pressure in the outside bladder 64 and the pressure in the inside bladder 76 arises. Gas accordingly flows between the outside bladder 64 and the inside bladder 76 through the communicating tube 86. The pressure in the outside bladder 64 and the pressure in the inside bladder 76 may thereby be substantially equalized at an early stage, whichever one, from out of the outside bladder 64 or the inside bladder 76, the gas is supplied to.

Moreover, in the present exemplary embodiment, the open/close valve 75 is provided between the outside bladder 64 and the inside bladder 76 so as to be capable of opening and closing. The outside bladder 64 and the inside bladder 76 are placed in communication with each other though the communicating tube 86 by opening the open/close valve 75. The pressure in the outside bladder 64 and the pressure in the inside bladder 76 may thereby be substantially equalized.

The pressure in the outside bladder 64 and the pressure in the inside bladder 76 may moreover be varied by closing off the open/close valve 75 to cut off the outside bladder 64 from the inside bladder 76. Accordingly, in a case in which one side out of the outside bladder 64 and the inside bladder 76 is supplied with gas due to prediction or detection of a collision, gas does not flow to the other out of the outside bladder 64 and the inside bladder 76 through the communicating tube 86. The bag body may thereby be effectively inflated.

Here, for example, in similar tube bodies, at the same flow speed, the flow rate of gas flowing in the tube body becomes larger the larger the flow path cross-sectional area of the tube body. In the present exemplary embodiment, the flow path cross-sectional area (A1) of the communicating tube 86 is set smaller than the flow path cross-sectional area (A2) of the outside bladder supply tube 82, and the flow path cross-sectional area (A3) of the inside bladder supply tube 84 (A1<A2, A1<A3). Namely, at the same flow speed, the flow rate of gas flowing in the outside bladder supply tube 82 and in the inside bladder supply tube 84 is configured to be higher than the flow rate of gas flowing in the communicating tube 86.

In a case in which gas is supplied from the pump 80, supply to the outside bladder 64 and the inside bladder 76 is thereby prioritized, such that the outside bladder 64 and the inside bladder 76 are made to inflate at an early stage. Gas flows more slowly in the communicating tube 86 than in the outside bladder supply tube 82 and in the inside bladder supply tube 84, corresponding to the ratio with the flow path cross-sectional area (A2) of the outside bladder supply tube 82, and the flow path cross-sectional area (A3) of the inside bladder supply tube 84. As a result, in a case in which a collision is predicted or detected, the outside bladder 64 and/or the inside bladder 76 may be made to inflate at an early stage, and then the pressure in the outside bladder 64 and the pressure in the inside bladder 76 may be substantially equalized gradually.

In the present exemplary embodiment, the pump 80 is provided inside the inside side support section 44. Although not illustrated in the drawings, sometimes a side air bag is provided to the window section 20 side of the vehicle seat 12 illustrated in FIG. 1 and FIG. 2, namely, inside the outside side support section 40. In the present exemplary embodiment, a space for the pump 80 is thereby secured by providing the pump 80 inside the inside side support section 44 positioned on the opposite side of the vehicle seat 12 to the window section 20.

In the exemplary embodiment described above, explanation has been given a case in which air is used as an example of the gas supplied to the outside bladder 64 and the inside bladder 76. However, the present disclosure is not limited to air.

Moreover, in the present exemplary embodiment, the crash safety sensor 90 determines whether or not a collision has been predicted or detected. However, when explaining chronologically, the signal to the ECU 88 is transmitted at an earlier timing than collision prediction or collision detection. However, this time difference is small, and it is sufficient that relative displacement of the seated occupant in the seat width direction can be suppressed at an early stage so as to protect the seated occupant, by the time that the processing executed by the ECU 88 is completed.

Furthermore, although not particularly discussed in the present exemplary embodiment, a side air bag device (not illustrated in the drawings) may obviously be disposed inside the outside side support section 40.

In the present exemplary embodiment, as illustrated in FIG. 2, the outside bladder 64 and the inside bladder 76 are respectively provided to the support walls 58C of the outside frame section 28 and the inside frame section 30 disposed on the seat width direction outside of the vehicle seat 12. The outside side pad portion 42 and the inside side pad portion 46 are thereby each capable of displacing toward the seat width direction central side of the vehicle seat 12. However, the placement locations of the outside bladder 64 and the inside bladder 76 are not limited thereto. For example, the outside bladder 64 and the inside bladder 76 may be respectively provided to the lateral walls 58A of the outside frame section 28 and of the inside frame section 30. In such cases, the outside side pad portion 42 and the inside side pad portion 46 are each capable of displacing (extending out) toward the front side of the vehicle seat 12. Here, relative displacement of the seated occupant along the seat width direction is suppressed due to the displacement of the outside side pad portion 42 and inside side pad portion 46 toward the front side of the vehicle seat 12. Furthermore, the outside bladder 64 and the inside bladder 76 may be respectively provided to both the support wall 58C and the lateral wall portion 58A of the outside frame section 28 and of the inside frame section 30. In such cases, the outside side pad portion 42 and the inside side pad portion 46 are each capable of displacing toward the seat width direction central side and the front side of the vehicle seat 12.

Explanation has been given regarding an exemplary embodiment of the present disclosure. However, various modifications may be implemented within a range not departing from the spirit of the present disclosure. Moreover, obviously, the scope of rights of the present disclosure is not limited to the above exemplary embodiment.

What is claimed is:

1. An occupant protection device comprising:
   a pair of side support sections provided at a seat width direction left and right of a seatback of a vehicle, a side pad being included inside each of the side support sections;
   a pair of movable plates respectively provided inside the side support sections abutting the respective side pad at a seat width direction outer side of the side pad, the movable plates being capable of swinging along a vehicle width direction;
   an outside bag body, provided inside an outside side support section out of the pair of side support sections which is disposed at a window section side of the vehicle, that displaces the outside side support section by gas being supplied to and inflating an interior portion of the outside bag body;
   an inside bag body, provided inside an inside side support section out of the pair of side support sections which is disposed at opposite side of the outside side support section, that displaces the inside side support section by gas being supplied to and inflating an interior portion of the inside bag body;
   a communicating connection member that places the outside bag body and the inside bag body in communication with each other,
      wherein the outside bag body and the inside bag body are each provided between an inside wall at a seat width direction central side of a frame section that configures the seat and the movable plate;
   a crash safety sensor that predicts or detects a collision of the vehicle; and
   a controller that supplies gas to one of the outside bag body and the inside bag body, whichever is disposed at a side near to a collision position, based on a result of a prediction or detection by the crash safety sensor.

2. The occupant protection device of claim 1, further comprising an open/close valve provided so as to be capable of opening or closing between the outside bag body and the inside bag body, and that, by opening, places the outside bag body and the inside bag body in communication with each other through the communicating connection member.

3. The occupant protection device of claim 1, further comprising:
   a pump disposed inside the inside side support section;
   an outside bag body connection member, connected to the pump and the outside bag body, that supplies gas from the pump to the outside bag body; and
   an inside bag body connection member, connected to the pump and the inside bag body, that supplies gas from the pump to the inside bag body,
   wherein the cross-sectional area of a flow path of the communicating connection member is set smaller than the cross-sectional area of a flow path of the outside bag body connection member and the cross-sectional area of a flow path of the inside bag body connection member.

* * * * *